Jan. 12, 1932. E. M. ALEXANDER 1,840,297

DEVICE FOR DISPLAYING GARDEN SEED PACKETS IN SEED DISPLAY CASES

Filed Nov. 2, 1928

INVENTOR
Ernest M. Alexander
BY
Fred C. Matherly
ATTORNEY

Patented Jan. 12, 1932

1,840,297

UNITED STATES PATENT OFFICE

ERNEST M. ALEXANDER, OF LA CONNER, WASHINGTON

DEVICE FOR DISPLAYING GARDEN SEED PACKETS IN SEED DISPLAY CASES

Application filed November 2, 1928. Serial No. 316,858.

The invention relates to improvements in seed display cases for the retail sale of garden seed in which a cylindrical roll placed behind the seed packets on an inclined shelf operates by gravity against the seed packets, keeping them thrust forward; and in which a cleat and fine wire at the front, maintain the speed packets in an upright and easily observable position; and in which groups of seed packets containing different varieties of seed are kept separate from each other by means of partitions.

The objects of the improvement are: first, to keep the seed packets constantly thrust forward to the front of the section which they occupy even after any number of packets have been removed from the said section; second, to maintain the seed packets in an upright position by means of a narrow cleat and a fine wire which do not obstruct free and easy observation of the printed and pictured matter which appears on the front of the packet; third, to keep the seed packets containing different varieties of seed separate in different sections of the shelves which compose the display case.

The object of the seed display case is to show all kinds and varieties of garden seeds so prominently and attractively and to make them so easily accessible that the public will not only be impelled to buy but also to expand their gardening programs by the suggestions pictured and printed on the front of the seed packets.

Figure 2:
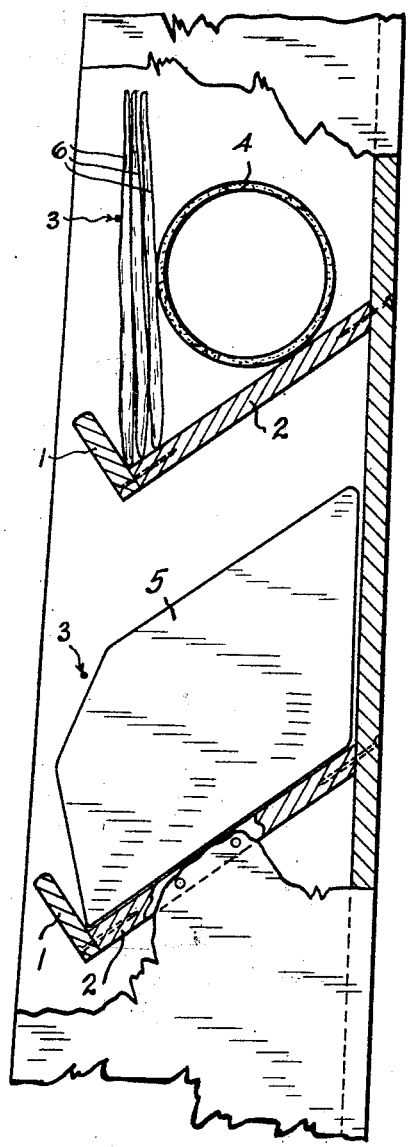
Figure 1:
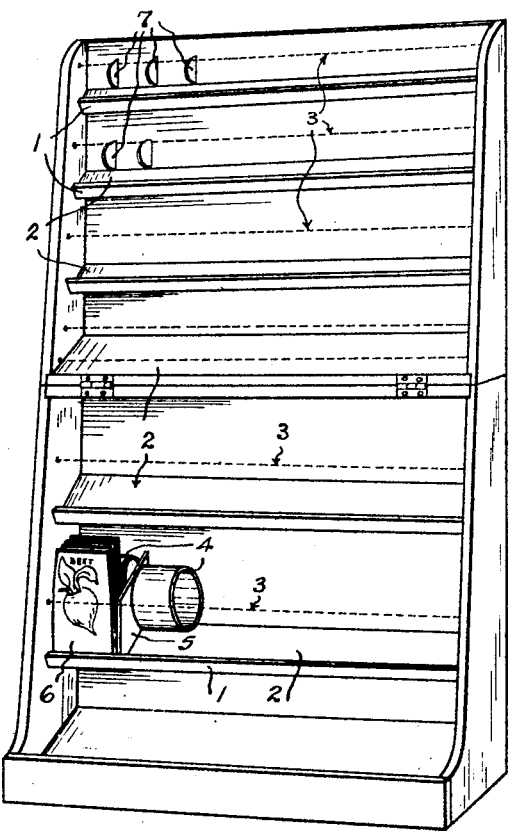

One form of the invention is illustrated in the accompanying drawings, in which Figure 1 is a perspective view of an entire garden seed display case composed of any number of shelves, one shelf of which is shown with two sections occupied, one section containing seed packets and one section with the seed packets removed and the cylindrical roll exposed; Figure 2 a fragmentary side view on a larger scale, with side board partially cut away, the upper section containing three seed packets which are thrust forward and held in an upright position from the rear by the cylindrical roll, and held in an upright position from the front by means of the narrow cleat and the fine wire; the lower section showing a side view of the movable partition which separates the sections.

In Figure 1, item 1 is a narrow cleat extending along the front of the shelf, item 2 is the base of the shelf inclined downward from the rear of the display case toward the front, item 3 is the fine wire stretching across the front of the shelf at the proper height to support the upper part of the seed packet, item 4 is the cylindrical roll which operates by gravity on the inclined shelf, item 5 is the movable partition separating different varieties, item 6 representing seed packets in position.

Figure 2 illustrates the side view of a section with all the devices in operation. Item 2, the inclined shelf, smooth, polished and varnished offers a minimum of friction resistance to the seed packets which slide downward and forward as fast as one or more packets are removed from the front of the section for sale. Item 1, the cleat is fastened by nails or glue or both to the front edge of the shelf, it retains the lower edge of the seed packet on the shelf. It is made purposely narrow so that it will not obscure any portion of the printed and pictured matter which appears on the front of the packets. Item 3, the fine wire, supports the upper part of the seed packets, keeping them from falling forward. It does not obscure a free and easy view of the printed and pictured matter which appears on the front of the seed packet. Item 4, the cylindrical roll, is placed behind the seed packet. This roll operates by gravity upon the inclined shelf thrusting the seed packet forward against the cleat and the fine wire. This cylindrical roll is composed of building paper, cardboard or other suitable material. It is of sufficient weight that the action of gravity will press it constantly against the seed packet. Item 6 shows three seed packets thus held.

The lower part of Figure 2 shows the side view of a shelf similar to that shown in the upper part of Figure 2 except that the seed packet and cylindrical roll have been removed leaving the partition, item 5, exposed to view. These partitions are composed of cardboard or thin material. They are placed in the position shown for the purpose of dividing the shelf into sections, each section containing a group of seed packets of the same variety of seed. These partitions are held in an upright position between the cylindrical rolls, no other support being required except in the narrow shelves. At the upper part of the seed display case the shelves are narrow, no rolls being required. They are used for the display of thin seed packets. On the narrow shelves the separating partitions, item 7 Figure 1 are fastened to the back of the shelf.

I am aware that prior to my invention, seed display cases have been made of a general shape and character similar to the one used in my invention. I therefore, do not claim hinged, upright or shelved display cases; but

I claim:

1. A display cabinet for seed packages, embodying a plurality of shelves disposed above one another and inclined downwardly from rear to front for supporting seed packages, a narrow cleat at the front edge of said shelves against which the bottom ends of the foremost packages may rest, a fine wire extending across said cabinet above each of said cleats against which the tops of said packages may rest without obsuring printed matter thereon, rolls disposed behind the rearmost seed package to hold all of said seed packages in upright position and to urge said seed packages forwardly against said cleat wire, and partitions disposed between adjacent rows of seed packages and between the ends of adjacent rolls and held in upright position by said rolls.

2. A display cabinet for seed packages embodying side and back walls, a plurality of shelves extending crosswise between said side walls and arranged one above another for the reception of seed packages and inclined downwardly from rear to front, a narrow cleat extending upwardly at the front edge of each of said shelves, a fine wire extending crosswise between said side walls above each of said cleats, removable partitions on each shelf forming compartments for rows of seed packages and gravity rolls operable in said compartments behind said seed packages, the ends of said rolls holding said partitions in upright position.

3. A display cabinet embodying an inclined shelf for seed packages, means at the front of said shelf against which the packages may rest, movable partitions on said shelf forming compartments, and gravity operated followers in said compartments behind said seed packages, the ends of said followers holding said partitions in upright position.

ERNEST M. ALEXANDER.